(12) United States Patent
Allgaier et al.

(10) Patent No.: US 12,342,745 B2
(45) Date of Patent: Jul. 1, 2025

(54) EXPANDABLE NETWORK ARCHITECTURE FOR COMMUNICATIONS BETWEEN MACHINES AND IMPLEMENTS

(71) Applicant: Precision Planting LLC, Tremont, IL (US)

(72) Inventors: Ryan Allgaier, East Peoria, IL (US); Ben L. Schlipf, Tremont, IL (US)

(73) Assignee: Precision Planting LLC, Tremont, IL (US)

( * ) Notice: Subject to any disclaimer, the term of this patent is extended or adjusted under 35 U.S.C. 154(b) by 866 days.

(21) Appl. No.: 17/267,712

(22) PCT Filed: Aug. 9, 2019

(86) PCT No.: PCT/IB2019/056793
§ 371 (c)(1),
(2) Date: Feb. 10, 2021

(87) PCT Pub. No.: WO2020/039295
PCT Pub. Date: Feb. 27, 2020

(65) Prior Publication Data
US 2021/0325868 A1 Oct. 21, 2021

Related U.S. Application Data

(60) Provisional application No. 62/721,782, filed on Aug. 23, 2018.

(51) Int. Cl.
*A01B 79/02* (2006.01)
*A01B 79/00* (2006.01)
(Continued)

(52) U.S. Cl.
CPC ............ *A01B 79/005* (2013.01); *A01B 79/02* (2013.01); *G05D 1/0022* (2013.01); *H04L 12/40* (2013.01);
(Continued)

(58) Field of Classification Search
CPC .................. A01B 79/005; A01B 79/02; A01C 19/00–19/045; B60R 16/023;
(Continued)

(56) References Cited

U.S. PATENT DOCUMENTS 5,924,371 A * 7/1999 Flamme .............. A01M 7/0089
701/50
6,009,354 A * 12/1999 Flamme ................. A01C 7/102
700/184

(Continued)

FOREIGN PATENT DOCUMENTS

JP 2017005617 A * 1/2017
WO 99/16005 A2 4/1999
(Continued)

OTHER PUBLICATIONS

Wikipedia article, "CAN bus", old revision dated Aug. 12, 2018, 19 pages (Year: 2018).*
(Continued)

*Primary Examiner* — David A Testardi

(57) ABSTRACT

Described herein are expandable network architectures with communication systems having multiple networks for communications between machines and implements for field operations including planting and harvesting operations. In one embodiment, a communication system includes a first communication module including at least one port of a first network, at least one input port and at least one output port of a second network, and a first network gateway to translate between a first protocol for the first network and a second protocol for the second network. A second communication module is communicatively coupled to tike first communication module. The second communication module includes at least one port of the first network, and at least at least one input port and at least one output port of the second network. The second communication module is configurable to (Continued)

expand a network architecture of the communication system by being capable of communicatively coupling to at least one additional communication module.

20 Claims, 6 Drawing Sheets

(51) Int. Cl.
*G05D 1/00* (2006.01)
*H04L 12/40* (2006.01)
*H04L 67/12* (2022.01)

(52) U.S. Cl.
CPC .... *H04L 67/12* (2013.01); *H04L 2012/40215* (2013.01); *H04L 2012/40273* (2013.01)

(58) Field of Classification Search
CPC ...... H04W 4/48; H04L 12/46–12/4695; H04L 69/08–69/085; H04L 2012/40215; H04L 2012/40267; H04L 2012/40273; H04L 67/12
See application file for complete search history.

(56) References Cited

U.S. PATENT DOCUMENTS

| | | | | |
|---|---|---|---|---|
| 6,070,538 A * | 6/2000 | Flamme | A01C 7/102 340/684 |
| 6,665,601 B1 * | 12/2003 | Nielsen | H04L 12/40 710/60 |
| 9,717,178 B1 * | 8/2017 | Sauder | B60K 35/00 |
| 2006/0130049 A1 * | 6/2006 | Eimers-Klose | H04L 12/66 717/171 |
| 2007/0198144 A1 * | 8/2007 | Norris | G05B 19/414 701/23 |
| 2009/0102626 A1 * | 4/2009 | Lesesky | G08G 1/017 340/431 |
| 2011/0184551 A1 * | 7/2011 | Kowalchuk | A01C 7/105 701/50 |
| 2012/0110356 A1 * | 5/2012 | Yousefi | B60R 19/03 713/320 |
| 2012/0173905 A1 | 7/2012 | Diab et al. | |
| 2012/0236525 A1 * | 9/2012 | Okada | H04L 12/40006 361/805 |
| 2012/0256763 A1 * | 10/2012 | Johnson | H04Q 9/00 340/870.07 |
| 2012/0307836 A1 * | 12/2012 | Ishigooka | H04L 12/40006 370/401 |
| 2013/0211628 A1 * | 8/2013 | Thurow | G01F 1/666 701/2 |
| 2014/0023068 A1 * | 1/2014 | Kim | H04L 12/40006 370/355 |
| 2014/0047152 A1 * | 2/2014 | Peters | H04L 67/12 710/305 |
| 2014/0277954 A1 * | 9/2014 | Nelson, Jr. | G06F 11/30 701/50 |
| 2014/0311113 A1 * | 10/2014 | Bonefas | A01D 34/001 56/10.2 R |
| 2014/0355610 A1 * | 12/2014 | Ge | H04L 45/74 370/392 |
| 2015/0124839 A1 * | 5/2015 | Kim | H04L 69/18 370/467 |
| 2015/0194039 A1 * | 7/2015 | Martin | G08B 25/007 340/632 |
| 2015/0237791 A1 * | 8/2015 | Bassett | A01B 73/005 172/3 |
| 2016/0182341 A1 * | 6/2016 | Fischer | H04L 12/40052 370/251 |
| 2016/0246296 A1 * | 8/2016 | Gelinske | H04W 4/70 |
| 2016/0295792 A1 * | 10/2016 | Secrest | A01C 7/04 |
| 2016/0332646 A1 * | 11/2016 | Kraeling | B61L 25/028 |
| 2017/0083026 A1 * | 3/2017 | Schmidt | A01B 69/008 |
| 2017/0134299 A1 * | 5/2017 | Park | H04L 69/22 |
| 2017/0202132 A1 * | 7/2017 | Maust | G05B 11/01 |
| 2017/0325443 A1 * | 11/2017 | Crinklaw | A01M 7/0014 |
| 2017/0325444 A1 * | 11/2017 | Crinklaw | A01M 7/0089 |
| 2018/0062988 A1 * | 3/2018 | Sikaria | H04L 12/4633 |
| 2018/0072250 A1 * | 3/2018 | Kim | H04L 63/08 |
| 2018/0124992 A1 * | 5/2018 | Koch | G01N 1/08 |
| 2018/0232959 A1 | 8/2018 | Thornburg et al. | |
| 2018/0287815 A1 * | 10/2018 | Yamamoto | H04L 12/4625 |
| 2018/0324640 A1 * | 11/2018 | Kaneko | H04W 92/02 |
| 2019/0104085 A1 * | 4/2019 | Smart | H04L 49/15 |
| 2019/0207862 A1 * | 7/2019 | Kajio | H04L 67/02 |
| 2019/0253272 A1 * | 8/2019 | Kolbus | H04L 12/40169 |
| 2019/0306180 A1 * | 10/2019 | Dyakin | G06F 21/566 |
| 2019/0354098 A1 * | 11/2019 | Kreiling | E02F 9/205 |
| 2019/0370220 A1 * | 12/2019 | Tsutsumi | G06F 12/126 |
| 2020/0119948 A1 * | 4/2020 | Habermehl | H04L 12/10 |
| 2020/0169555 A1 * | 5/2020 | Chung | H04L 63/0876 |

FOREIGN PATENT DOCUMENTS

| | | | | |
|---|---|---|---|---|
| WO | WO-2008125614 A2 * | 10/2008 | | H04L 12/403 |
| WO | 2015/077743 A1 | 5/2015 | | |
| WO | WO-2016086035 A1 * | 6/2016 | | G06F 3/0488 |
| WO | WO-2017058616 A1 * | 4/2017 | | A01C 21/007 |

OTHER PUBLICATIONS

Wikipedia article, "Gateway (telecommunications)", old revision dated Aug. 10, 2018, 4 pages (Year: 2018).*
Wikipedia article, "Power over Ethernet", old revision dated Aug. 19, 2018, 10 pages (Year: 2018).*
European Patent Office, Office Action related to European Patent Application No. 19778649.4, mail date Apr. 21, 2023, 4 pages.
European Patent Office, International Search Report for parent International Application No. PCT/IB2019/056793, mail date Nov. 29, 2019.

* cited by examiner

EXPANDABLE NETWORK ARCHITECTURE FOR COMMUNICATIONS BETWEEN MACHINES AND IMPLEMENTS

RELATED APPLICATIONS

This application claims the benefit of U.S. Provisional Application No. 62/721,782 filed on Aug. 23, 2018 entitled: EXPANDABLE NETWORK ARCHITECTURE FOR COMMUNICATIONS BETWEEN MACHINES AND IMPLEMENTS, the entire contents of which are incorporated by reference herein.

TECHNICAL FIELD

Embodiments of the present invention relate to an expandable network architecture with communication systems having multiple networks for communications between machines and implements.

BACKGROUND

Planters are used for planting crops (e.g., corn, soybeans) in a field. Planters typically have numerous row units (e.g., 8, 16, 32) for planting seeds and collecting data from sensors. Planters typically utilize a controller area network (CAN) serial bus protocol for a single CAN bus to transmit communications from sensors and controllers to a machine (e.g., tractor). The single CAN bus may not have sufficient bandwidth for quickly transmitted communications from an ever-increasing number of controllers and sensors on the planter or other types of implements.

SUMMARY

Described herein are expandable network architectures with communication systems having multiple networks for communications between machines and implements for field operations including planting operations. In one embodiment, a communication system includes a first communication module including at least one port of a first network, at least one input port and at least one output port of a second network, and a first network gateway (e.g., protocol translation gateway, mapping gateway) includes a protocol translator to translate or convert between a first protocol for the first network and a second protocol for the second network. A second communication module is communicatively coupled to the first communication module. The second communication module includes at least one port of the first network, and at least at least one input port and at least one output port of the second network. The second communication module is configurable to expand a network architecture of the communication system by being capable of communicatively coupling to at least one additional communication module.

BRIEF DESCRIPTION OF THE DRAWINGS

The present invention is illustrated by way of example, and not by way of limitation, in the figures of the accompanying drawings and in which.

DETAILED DESCRIPTION

Described herein are expandable network architectures with communication systems having multiple networks for communications between machines and implements for field operations including planting operations. In one embodiment, a communication system includes a first communication module including at least one port of a first network, at least one input port and at least one output port of a second network, and a first network gateway to translate or convert between a first protocol for the first network and a second protocol for the second network. A second communication module is communicatively coupled to the first communication module. The second communication module includes at least one port of the first network, and at least at least one input port and at least one output port of the second network. The second communication module is configurable to expand a network architecture of the communication system by being capable of communicatively coupling to at least one additional communication module.

In one example, an implement includes sensors and controllers that utilize a first network (e.g., controller area network (CAN). The network gateway translates or converts between a first protocol for the first network and a second protocol for a second network having a switched power line coupled with a communications channel (e.g., Ethernet, PoE network) that can have significantly higher bit rates and bandwidth in comparison to CAN bit rates.

In the following description, numerous details are set forth. It will be apparent, however, to one skilled in the art, that embodiments of the present invention may be practiced without these specific details. In some instances, well-known structures and devices are shown in block diagram form, rather than in detail, in order to avoid obscuring embodiments of the present invention.

Figure 1:
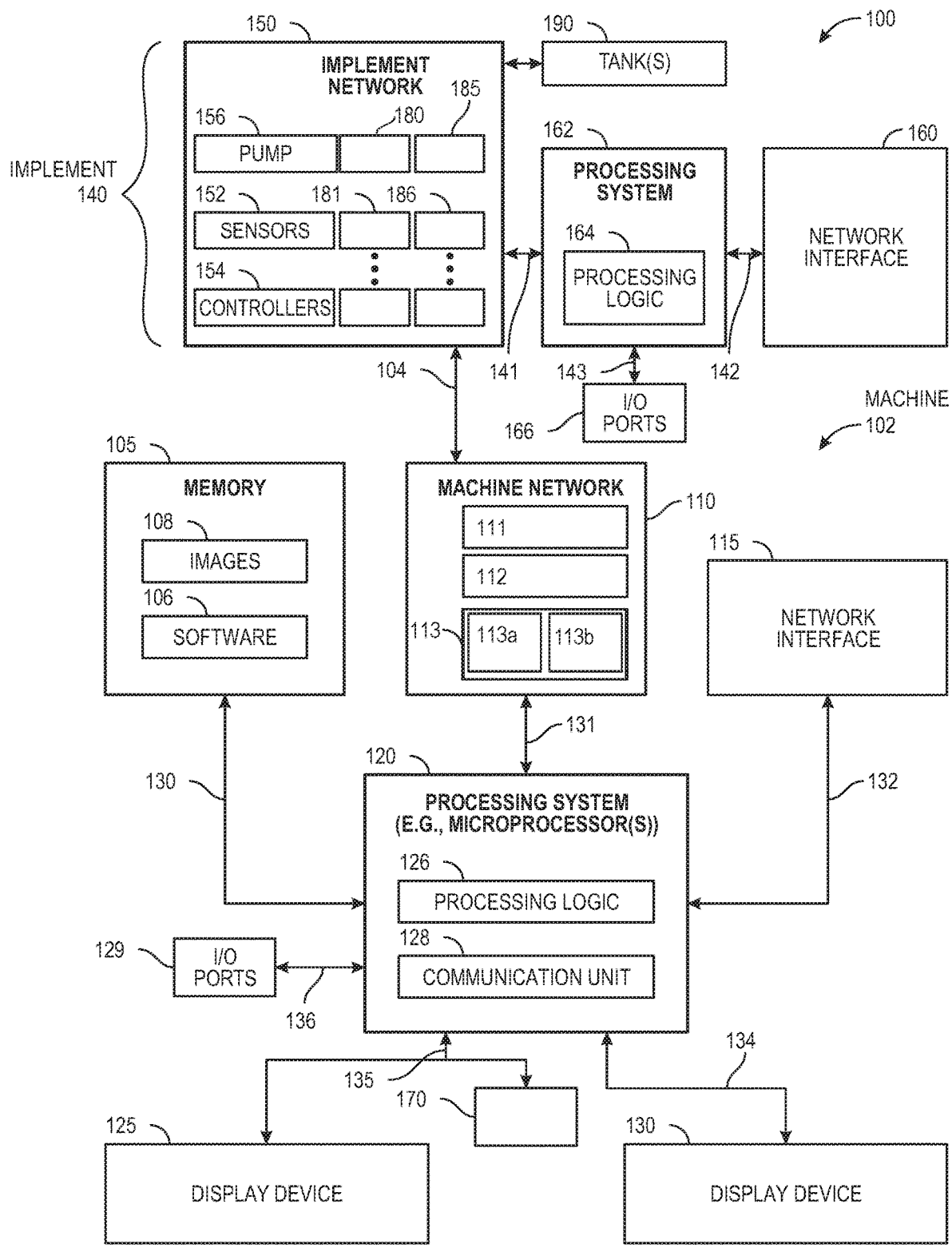
FIG. 1 shows an example of a block diagram of a system 100 that includes a machine 102 (e.g., tractor, combine harvester, etc.) and an implement 140 (e.g., planter, cultivator, plough, sprayer, spreader, irrigation implement, etc.) in accordance with one embodiment.

FIG. 1 shows an example of a block diagram of a system 100 that includes a machine 102 (e.g., tractor, combine harvester, etc.) and an implement 140 (e.g., planter, cultivator, plough, sprayer, spreader, irrigation implement, etc.) in accordance with one embodiment. The machine 102 includes a processing system 120, memory 105, machine network 110 that includes multiple networks (e.g., an Ethernet network, a network with a switched power line coupled with a communications channel (e.g., Power over Ethernet (PoE) network), a controller area network (CAN) serial bus protocol network, an ISOBUS network, etc.), and a network interface 115 for communicating with other systems or devices including the implement 140. The machine network 110 includes sensors 112 (e.g., speed sensors), controllers 111 (e.g., GPS receiver, radar unit) for controlling and monitoring operations of the machine or implement. The network interface 115 can include at least one of a GPS transceiver, a WLAN transceiver (e.g., WiFi), an infrared transceiver, a Bluetooth transceiver, Ethernet, or other interfaces from communications with other devices and systems including the implement 140. The network interface 115 may be integrated with the machine network 110 or separate from the machine network 110 as illustrated in FIG. 1. The I/O ports 129 (e.g., diagnostic/on board diagnostic (OBD) port) enable communication with another data processing system or device (e.g., display devices, sensors, etc.).

In one example, the machine performs operations of a tractor that is coupled to an implement for planting or fluid applications of a field. Data associated with the planting or fluid applications can be displayed on at least one of the display devices 125 and 130.

The processing system 120 may include one or more microprocessors, processors, a system on a chip (integrated circuit), or one or more microcontrollers. The processing system includes processing logic 126 for executing software instructions of one or more programs and a communication unit 128 (e.g., transmitter, transceiver) for transmitting and receiving communications from the machine via machine network 110 or network interface 115 or implement via implement network 150 or network interface 160. The communication unit 128 may be integrated with the processing system or separate from the processing system. In one embodiment, the communication unit 128 is in data communication with the machine network 110 and implement network 150 via a diagnostic/OBD port of the I/O ports 129 or via network devices 113a and 113b. A communication module 113 includes network devices 113a and 113b. The communication module 113 may be integrated with the communication unit 128 or a separate component.

Processing logic 126 including one or more processors may process the communications received from the communication unit 128 including agricultural data (e.g., planting data, GPS data, liquid application data, flow rates, etc.). The system 120 includes memory 105 for storing data and programs for execution (software 106) by the processing system. The memory 105 can store, for example, software components such as planting application software for analysis of planting applications for performing operations of the present disclosure, or any other software application or module, images (e.g., captured images of crops), alerts, maps, etc. The memory 105 can be any known form of a machine readable non-transitory storage medium, such as semiconductor memory (e.g., flash; SRAM; DRAM; etc.) or non-volatile memory, such as hard disks or solid-state drive. The system can also include an audio input/output subsystem (not shown) which may include a microphone and a speaker for, for example, receiving and sending voice commands or for user authentication or authorization (e.g., biometrics).

The processing system 120 communicates bi-directionally with memory 105, machine network 110, network interface 115, display device 130, display device 125, and I/O ports 129 via communication links 130-136, respectively.

Display devices 125 and 130 can provide visual user interfaces for a user or operator. The display devices may include display controllers. In one embodiment, the display device 125 is a portable tablet device or computing device with a touchscreen that displays data (e.g., planting application data, liquid or fluid application data, captured images, localized view map layer, high definition field maps of as-applied liquid or fluid application data, as-planted or as-harvested data or other agricultural variables or parameters, yield maps, alerts, etc.) and data generated by an agricultural data analysis software application and receives input from the user or operator for an exploded view of a region of a field, monitoring and controlling field operations. The operations may include configuration of the machine or implement, reporting of data, control of the machine or implement including sensors and controllers, and storage of the data generated. The display device 130 may be a display (e.g., display provided by an original equipment manufacturer (OEM)) that displays images and data for a localized view map layer, as-applied liquid or fluid application data, as-planted or as-harvested data, yield data, controlling a machine (e.g., planter, tractor, combine, sprayer, etc.), steering the machine, and monitoring the machine or an implement (e.g., planter, combine, sprayer, etc.) that is connected to the machine with sensors and controllers located on the machine or implement.

A cab control module 170 may include an additional control module for enabling or disabling certain components or devices of the machine or implement. For example, if the user or operator is not able to control the machine or implement using one or more of the display devices, then the cab control module may include switches to shut down or turn off components or devices of the machine or implement.

The implement 140 (e.g., planter, cultivator, plough, sprayer, spreader, irrigation, implement, etc.) includes an implement network 150 having multiple networks, a processing system 162 having processing logic 164, a network interface 160, and optional input/output ports 166 for communicating with other systems or devices including the machine 102. The implement network 150 having multiple networks (e.g., Ethernet network, Power over Ethernet (PoE) network, a controller area network (CAN) serial bus protocol network, an ISOBUS network, etc.) may include a pump 156 for pumping liquid or fluid from a storage tank(s) 190 to row units of the implement, communication modules (e.g., 180, 181, 185, 186, . . . ) for receiving communications from controllers and sensors and transmitting these communications to the machine network. In one example, the communication modules include first and second network devices with network ports. A first network device with a port (e.g., CAN port) of communication module (CM) 180 receives a communication with data from controllers and sensors, this communication is translated or converted from a first protocol into a second protocol for a second network device (e.g., network device with a switched power line coupled with a communications channel, Ethernet), and the second protocol with data is transmitted from a second network port (e.g., Ethernet port) of CM 180 to a second network port of a second network device 113b of the machine network 110. A first network device 113a having first network ports (e.g., 1-4 CAN ports) transmits and receives communications from first network ports of the implement.

Sensors 152 (e.g., speed sensors, seed sensors for detecting passage of seed, downforce sensors, actuator valves, OEM sensors, flow sensors, etc.), controllers 154 (e.g., drive system for seed meter, GPS receiver), and the processing system 162 control and monitoring operations of the implement.

The OEM sensors may be moisture sensors or flow sensors for a combine, speed sensors for the machine, seed force sensors for a planter, liquid application sensors for a sprayer, or vacuum, lift, lower sensors for an implement. For example, the controllers may include processors in communication with a plurality of seed sensors. The processors are configured to process data (e.g., liquid application data, seed sensor data) and transmit processed data to the processing system 162 or 120. The controllers and sensors may be used for monitoring motors and drives on a planter including a variable rate drive system for changing plant populations. The controllers and sensors may also provide swath control to shut off individual rows or sections of the planter. The sensors and controllers may sense changes in an electric motor that controls each row of a planter individually. These sensors and controllers may sense seed delivery speeds in a seed tube for each row of a planter.

The network interface 160 can be a GPS transceiver, a WLAN transceiver (e.g., WiFi), an infrared transceiver, a Bluetooth transceiver, Ethernet, or other interfaces from communications with other devices and systems including the machine 102. The network interface 160 may be integrated with the implement network 150 or separate from the implement network 150 as illustrated in FIG. 1.

The processing system 162 communicates bi-directionally with the implement network 150, network interface 160, and I/O ports 166 via communication links 141-143, respectively. The implement communicates with the machine via wired and possibly also wireless bi-directional communications 104. The implement network 150 may communicate directly with the machine network 110 or via the network interfaces 115 and 160. The implement may also by physically coupled to the machine for agricultural operations (e.g., planting, harvesting, spraying, etc.). The memory 105 may be a machine-accessible non-transitory medium on which is stored one or more sets of instructions (e.g., software 106) embodying any one or more of the methodologies or functions described herein. The software 106 may also reside, completely or at least partially, within the memory 105 and/or within the processing system 120 during execution thereof by the system 100, the memory and the processing system also constituting machine-accessible storage media. The software 1206 may further be transmitted or received over a network via the network interface 115.

In one embodiment, a machine-accessible non-transitory medium (e.g., memory 105) contains executable computer program instructions which when executed by a data processing system cause the system to perform operations or methods of the present disclosure It will be appreciated that additional components, not shown, may also be part of the system in certain embodiments, and in certain embodiments fewer components than shown in FIG. 1 may also be used in a data processing system. It will be appreciated that one or more buses, not shown, may be used to interconnect the various components as is well known in the art.

Figure 2:
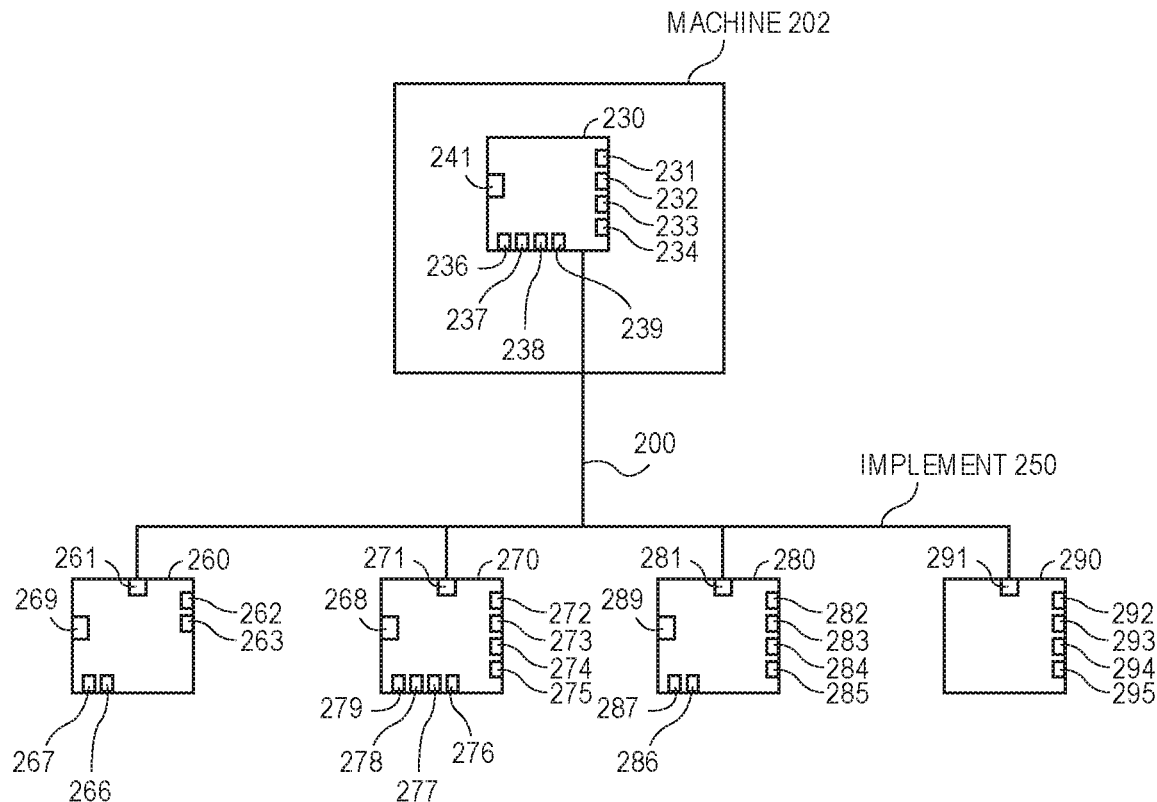
FIG. 2 shows an example of an expandable network architecture for communications between different nodes in accordance with one embodiment.

FIG. 2 shows an example of an expandable network architecture (e.g., communication system) for communications between different nodes in accordance with one embodiment. In one example, the expandable network architecture 200 (e.g., communication system 200) includes multiple networks (e.g., network having a switched power line coupled with a communications channel (e.g., PoE network), CAN) for improved bandwidth and speed of communications between a machine and an implement.

The expandable network architecture is adaptable for use with existing machine and implement networks that typically have CAN due to controllers and sensors typically being designed for CAN buses. The addition of the network having a switched power line coupled with a communications channel (e.g., PoE network) improves network performance (e.g., bandwidth, speed) for a large number of controllers and sensors that send data from an implement to a machine. The addition of the PoE network may also reduce a number of harnesses needed for routing signals between the machine and the implement.

FIG. 2 illustrates an expandable network architecture 200 (e.g., communication system) having communication modules 230, 260, 270, 280, and 290. In this example, the module 230 is located on a machine 202 and the modules 260, 260, 280, and 290 are located on an implement 250. The communication module 230 may be part of a power distribution module of the machine 202 or coupled to the power distribution module. The module 230 in this example includes PoE ports 231-234 (e.g., Ethernet ports) and CAN ports 236-239.

In this example, the module 260 includes input port 261, PoE ports 262-263, and CAN ports 266-267. The module 270 includes input port 271, PoE ports 272-275, and CAN ports 276-279. The module 280 includes input port 281, PoE ports 282-285, and CAN ports 286-287. The module 290 includes input port 291, PoE ports 292-295 and no CAN ports. Each communication module includes at least one PoE port and zero or more CAN ports.

The expandable network has no limits on a number of communication modules that are communicatively coupled to each other. In one example, one of the ports 231-234 is communicatively coupled to input port 271 of module 270. One of the ports 272-275 of module 270 is communicatively coupled to input port 261 of module 260 and a different one of ports 272-275 is communicatively coupled to input port 281 of module 280. One of the ports 282-285 of module 280 is communicatively coupled to input port 291 of module 290.

In another example, one of the ports 231-234 is communicatively coupled to input port 281 of module 280. One of the ports 282-285 of module 280 is communicatively coupled to input port 291 of module 290 and a different one of ports 282-285 is communicatively coupled to input port 271 of module 270. One of the ports 272-275 of module 270 is communicatively coupled to input port 261 of module 260. Each communication module of the implement 250 can be associated with or located on row unit of the implement 250.

The CAN and CAN devices operate in a peer to peer manner without a host computer. Each communication module with at least one CAN port represents a CAN node. CAN nodes are connected to each other with a daisy chain wiring scheme. In one example, a 2 wire bus connects CAN nodes to each other. In one example, a physical location of the communication modules on an implement can be inferred based on having a daisy chain wiring scheme for connecting the CAN nodes. A sequence of signals can be sent on the CAN via the daisy chain wiring scheme to identify communication modules and then infer physical location. Bit rates up to 1 Mbit/second are possible at network lengths less than 40 meters.

In another example, a network gateway translates or converts between a CAN protocol to an Ethernet protocol or from Ethernet protocol to CAN protocol. A communication to be translated from the CAN protocol to the Ethernet protocol includes header information with metadata and also payload data that is received from CAN controllers and sensors on an implement. The header information is translated from the CAN protocol to the Ethernet protocol while the payload data may not change during this translation. The network gateway can inspect the header information including a source identification (ID) or source address to determine a source port (e.g., CAN port, Ethernet port) that sent this communication. Then, the network gateway can determine a physical location of the source port based on the source ID.

Figure 7:
FIG. 7 illustrates an example packet 700 having header information and payload data in accordance with one embodiment.
Figure 7:
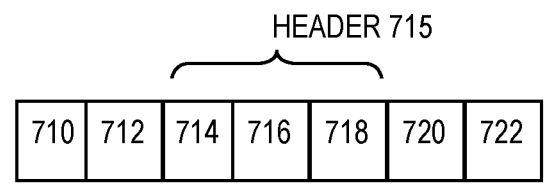

FIG. 7 illustrates an example packet 700 having header information and payload data in accordance with one embodiment. The packet 700 (e.g., Ethernet packet) may include a preamble 710 to allow devices on a network to synchronize receiver clocks, a start of frame delimiter 712, and header information 715 that includes a destination address 714, a source address 716, and a type or length field 718. The packet 700 also includes payload data 720 and a frame check sequence (FCS) field 722 that can be a cyclic redundancy check (CRC) that allows detection of corrupted data within an entire frame of the packet as received on the receiver side.

The network having a switched power line coupled with a communications channel (e.g., PoE network) passes electric power and data on cabling (e.g., twisted pair Ethernet cable). A single cable provides both a data connection and electric power to devices (e.g., communication modules, cameras, routers, sensors, controllers, etc.). A communication module can receive power from an upstream module having PoE or have a separate power supply. Power sourcing equipment (PSE) refers to devices such as network switches that source power to the PoE cable. A powered device receives power from PSE. The PoE can have significantly higher bit rates (e.g., 10 Mbit/second 10BASE-T, 100 Mbit/second 100BASE-TX, 1000 Mbit/second 1000BASE-T Ethernet) depending on current PoE standards in comparison to CAN bit rates. The PoE also supports longer cable length natively in comparison to CAN cable length. The PoE network can identify each communication module having a PoE port and also determine a physical location for each communication module. In one example, the PoE network can determine a physical location for each communication module on a row unit of an implement. The PoE network transmits a sequence of messages to each port of each module to determine how each PoE port is configured (e.g., port 1 connected to port 2, port 1 has no connection, etc.). The PoE network also prioritizes communications to be sent between modules.

Each communication module having a CAN device with at least one CAN port and an Ethernet device with at least one Ethernet port includes a network gateway (e.g., network gateways 241, 269, 268, 289) for translating or converting between a CAN protocol to an Ethernet protocol or from Ethernet protocol to CAN protocol. CAN protocol with data that is received from CAN controllers and sensors on an implement can be converted into Ethernet protocol with data and then transmitted on the PoE network to the machine. This transmission of data on the PoE network has significantly more bandwidth and higher transmission rate than transmitted data on the CAN.

Figure 3:
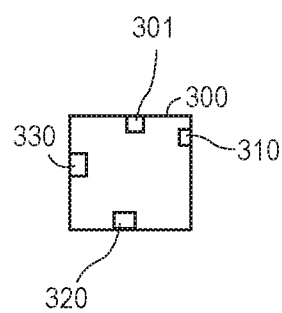
FIG. 3 illustrates a communication module with one CAN port and one Ethernet port in accordance with one embodiment.

FIG. 3 illustrates a communication module with one CAN port and one network port for a switched power line coupled with a communications channel (e.g., PoE port) in accordance with one embodiment. The communication module 300 includes input port 301, Ethernet port 310, CAN port 320, and network gateway 330 for translation or converting from CAN protocol to Ethernet protocol or from Ethernet protocol to CAN protocol.

Figure 4:
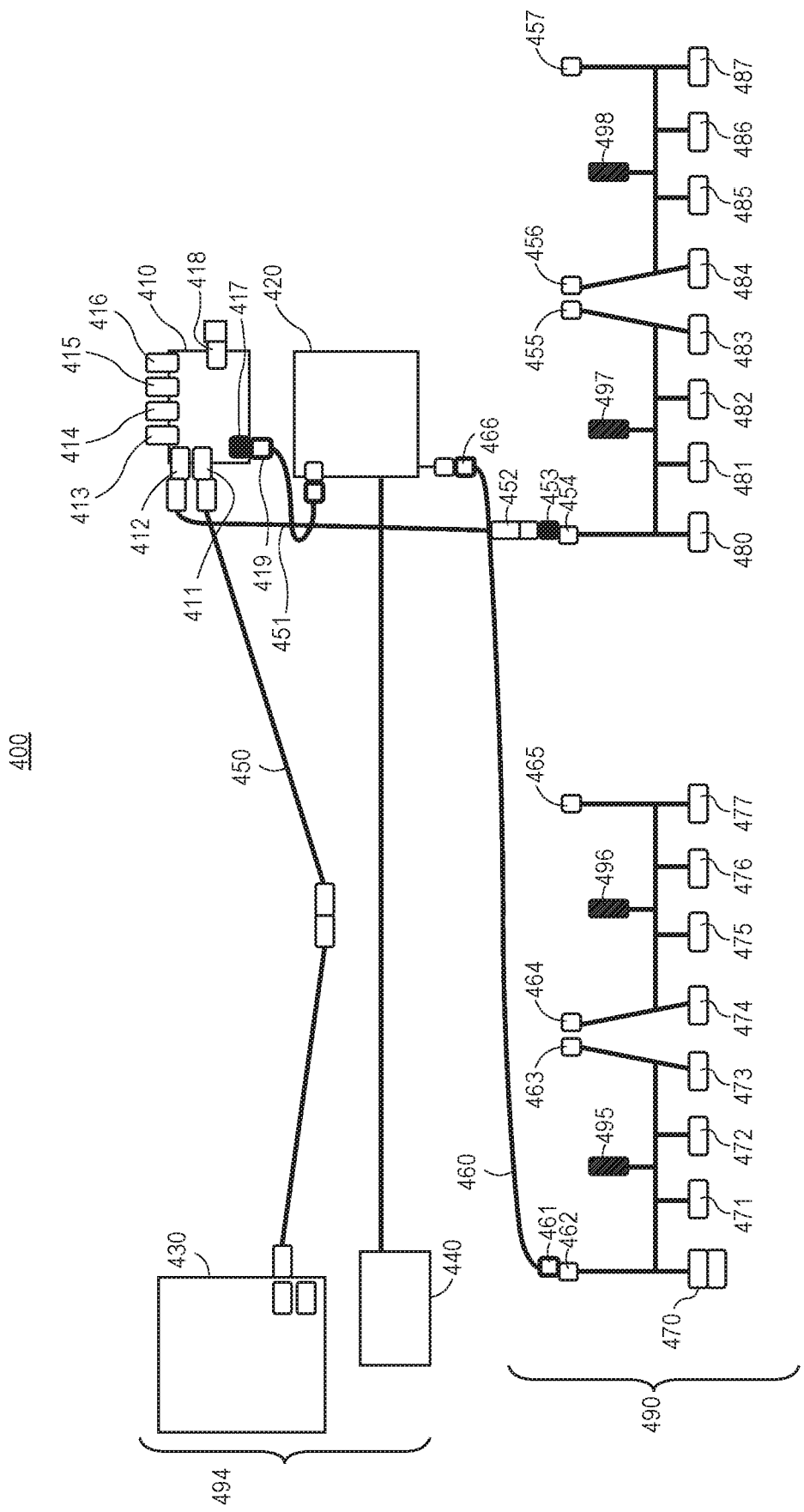
FIG. 4 illustrates an expandable network architecture 400 with multiple networks for communication modules in accordance with one embodiment.

FIG. 4 illustrates an expandable network architecture 400 (e.g., communication system 400) with multiple network devices for communication modules in accordance with one embodiment. In this example, the expandable network includes first and second network components (e.g., Ethernet and CAN network components). A display or monitor 430 of a machine 494 is communicatively coupled with Ethernet cable 450 to a communication module 410.

The communication module 410 may be part of a power distribution and data transfer module 420 or a separate component that is coupled to the module 420. The module 410 in this example includes a network device having a switched power line coupled with a communications channel (e.g., PoE network device) with Ethernet or PoE ports 411-416 and network gateway 417 (e.g., Ethernet/CAN network gateway) that is coupled to a CAN device with CAN port 419. In one example, the network gateway 417 can translate or convert from a first protocol having low speed Ethernet data to a second protocol having 4 pin CAN data for the CAN port 419. A power module 418 receives power from a power module of the module 420 via a connection (not shown). An alternator (e.g., 12 Volt) may be coupled to the module 420. The module 420 provides power to ports 495-498 via power cables (not shown for clarity). A CAN port 466 of module 420 sends and receives CAN data from CAN port 461 via CAN cable 460. A power source 440 (e.g., battery) provides power to the module 420.

In this example, an implement 490 includes row units 470-477, 480-487, and CAN ports 461-465, 454-457 that are communicatively coupled to sensors and controllers of the implement 490. The module 410 includes an Ethernet port 412 that is communicatively coupled to Ethernet port 452 of the implement 490 via Ethernet cable 451. A network gateway 453 (e.g., Ethernet/CAN network gateway) translates or converts between CAN protocol received from CAN port 454 and Ethernet protocol for Ethernet port 452.

Figure 5:
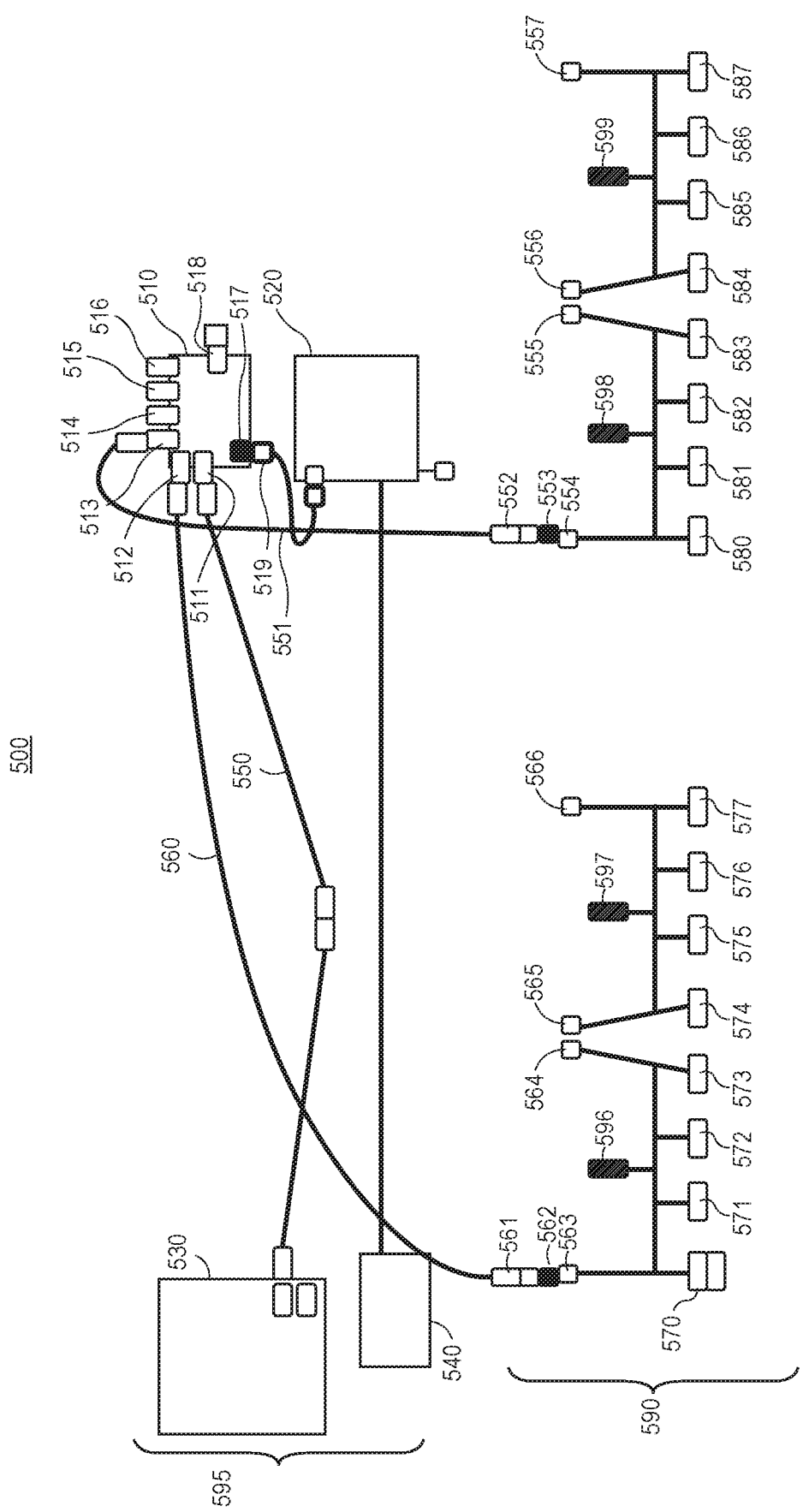
FIG. 5 illustrates an expandable network architecture 500 with multiple networks for communication modules in accordance with one embodiment.

FIG. 5 illustrates an expandable network architecture 500 (e.g., communication system 500) with multiple networks for communication modules in accordance with one embodiment. In this example, the expandable network includes first and second network components (e.g., network device having a switched power line coupled with a communications channel (e.g., PoE network device) and CAN network components). A display or monitor 530 of a machine 595 is communicatively coupled with Ethernet cable 550 to a communication module 510.

The communication module 510 may be part of a power distribution and data transfer module 520 or a separate component that is coupled to the power distribution module 520. The module 510 in this example includes Ethernet or PoE ports 511-516 and network gateway 517 (e.g., Ethernet/CAN network gateway) that is coupled to a CAN port 519. In one example, the network gateway 517 can translate or convert from a first protocol having low speed Ethernet data to a second protocol having 4 pin CAN data for the CAN port 519. A power module 518 receives power from a power module of the module 520 via connection (not shown). An alternator (e.g., 20 Volt) may be coupled to the module 520 for a high voltage implementation. The module 520 provides power to ports 596-599 via power cables (not shown for clarity). A power source 540 (e.g., battery) provides power to the module 520.

In this example, an implement 590 includes row units 570-577, 580-587, and CAN ports 563-566, 554-557 that are communicatively coupled to sensors and controllers of the implement 590. The module 510 includes an Ethernet port 513 that is communicatively coupled to Ethernet port 552 of the implement 590 via Ethernet cable 551. A network gateway 553 (e.g., Ethernet/CAN network gateway) translates or converts from a first protocol having CAN data received from CAN port 554 into a second protocol having Ethernet data for Ethernet port 552.

The module 510 includes an Ethernet port 512 that is communicatively coupled to Ethernet port 561 of the implement 590 via Ethernet cable 560. A network gateway 562 (e.g., Ethernet/CAN network gateway) 562 translates or converts a first protocol having CAN data received from CAN port 563 into a second protocol having Ethernet data for Ethernet port 561.

Figure 6:
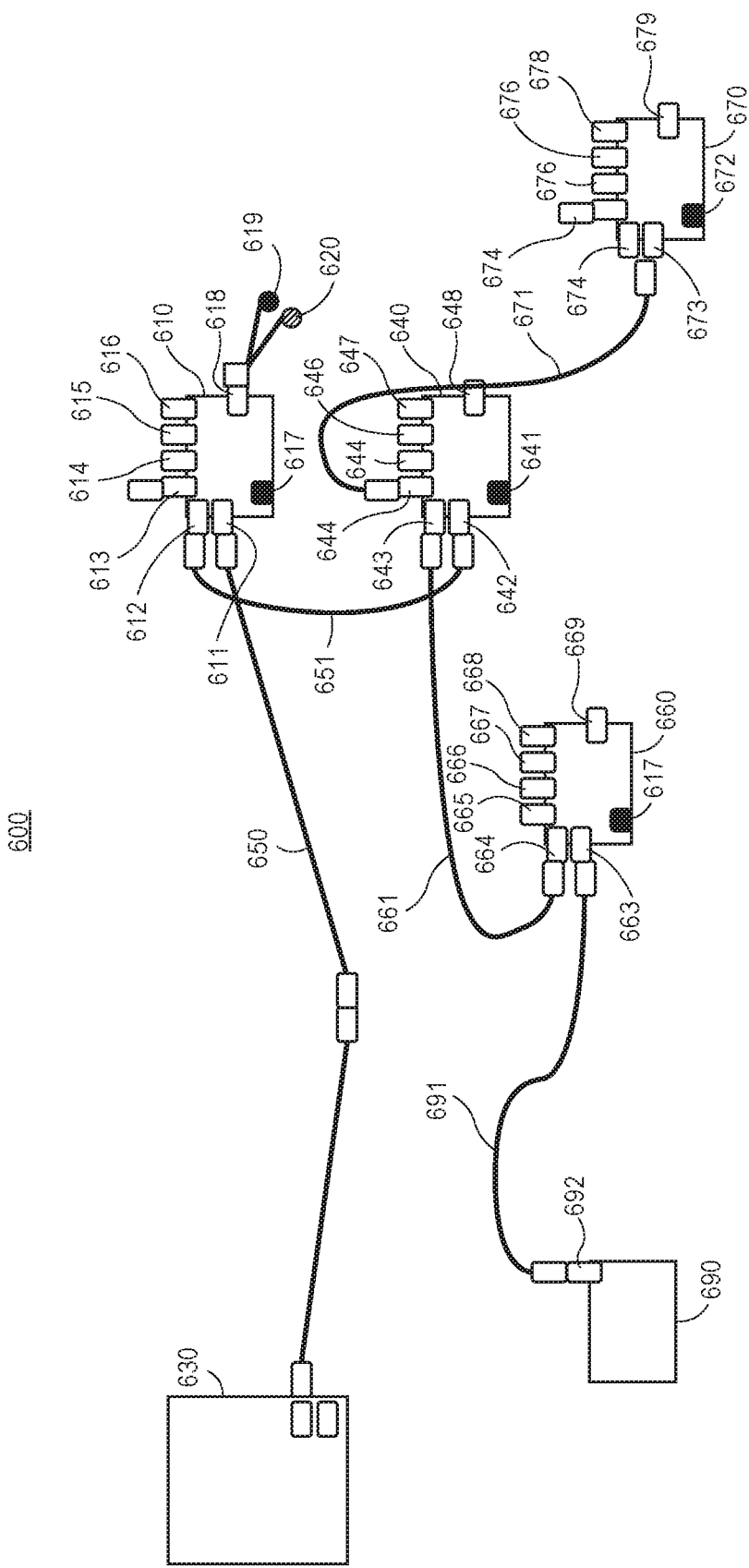
FIG. 6 illustrates an expandable network architecture 600 with multiple networks for communication modules in accordance with one embodiment.

FIG. 6 illustrates an expandable network architecture 600 (e.g., communication system 600) with multiple networks for communication modules in accordance with one embodiment. In this example, the expandable network includes first and second network components (e.g., network device having a switched power line coupled with a communications channel (e.g., PoE network device) and CAN network components). A display or monitor 630 of a machine is communicatively coupled with Ethernet cable 650 to a communication module 610 that includes Ethernet ports 611-616, power module 618 having terminals 619 and 620 for connecting to module 640, and network gateway 617 (e.g., Ethernet/CAN network gateway). The communication module 610 is coupled to other communication modules 640, 660, 670, and any type of Ethernet based modules (e.g., camera 690 having Ethernet port 692) via Ethernet cables 651, 661, 671, and 691. The communication module 640 includes Ethernet ports 642-647, power module 648, and network gateway 641 (e.g., Ethernet/CAN network gateway). The communication module 660 includes Ethernet ports 663-668, power module 669, and network gateway 662 (e.g., Ethernet/CAN network gateway). The communication module 670 includes Ethernet ports 673-678, power module 679, and network gateway 672 (e.g., Ethernet/CAN network gateway).

It is to be understood that the above description is intended to be illustrative, and not restrictive. Many other embodiments will be apparent to those of skill in the art upon reading and understanding the above description. The scope of embodiments of the invention should, therefore, be determined with reference to the appended claims, along with the full scope of equivalents to which such claims are entitled.

The invention claimed is:

1. A communication system, comprising:
a first communication module of a machine includes at least one port of a first network, at least two ports of a second network, and a first network gateway that is configured to translate between a first protocol for the first network and a second protocol for the second network, wherein the first protocol is different from the second protocol; and
a second communication module of a first row unit of an agricultural implement is communicatively coupled to the first communication module of the machine with an Ethernet cable, the second communication module includes an input port connected to the first communication module, at least one port of the first network, at least two ports of the second network, and a second network gateway that is configured to translate between the first protocol for the first network and the second protocol for the second network with the second communication module being configurable to expand a network architecture of the communication system by communicatively coupling to at least one additional communication module of a second row unit of the agricultural implement, wherein the second network comprises a Power over Ethernet (POE) network.

2. The communication system of claim 1, wherein the second communication module includes the at least one port of the first network to receive data from at least one of sensors and controllers of the agricultural implement.

3. The communication system of claim 2, wherein the second network comprises the PoE network to pass electric power and data on the Ethernet cable.

4. The communication system of claim 3, wherein the at least two ports of the second network comprise PoE ports.

5. The communication system of claim 4, wherein the POE network transmits a sequence of messages to the at least two ports of the second communication module to determine a configurable connection for each of the at least two ports of the second communication module.

6. The communication system of claim 5, wherein the PoE network supports significantly higher bit rates than bit rates of the first network.

7. The communication system of claim 4, wherein the second communication module receives power from an upstream module having PoE or has a separate power supply.

8. The communication system of claim 1, wherein the first network comprises a controller area network (CAN) and the at least one port of the first communication module comprises a CAN port.

9. The communication system of claim 1, wherein the first communication module is located on the machine and the second communication module is located on the agricultural implement, wherein the machine is a tractor or a combine harvester.

10. The communication system of claim 1, wherein the first network gateway is configured to receive a communication, to inspect header information from a packet of the communication, to determine a source port that sent this communication based on source identification (ID) or source address of the header information, and to determine a physical location of the source port based on the source ID or source address.

11. The communication system of claim 1, wherein the second communication module is configurable to expand a network architecture of the communication system by having multiple ports of the second network with at least one port being communicatively coupling to at least one additional communication module of the agricultural implement.

12. An agricultural implement, comprising:
a plurality of row units for agricultural operations;
a first communication module that is associated with a first group of row units, the first communication module of the agricultural implement includes at least one port of a first network to receive data from at least one of sensors and controllers of the agricultural implement, at least two ports of a second network, and a first network gateway to translate between a first protocol for the first network and a second protocol for the second network, wherein the first protocol is different from the second protocol; and
a second communication module communicatively coupled to the first communication module, wherein the second communication module is associated with a second group of row units and includes at least one port of the first network to receive data from at least one of sensors and controllers of the agricultural implement, at least two ports of the second network, and a second network gateway of the second communication module to translate between the first protocol for the first network and the second protocol for the second network, wherein the second network comprises a Power over Ethernet (POE) network.

13. The implement of claim 12, wherein the second communication module is a single communication module.

14. The implement of claim 13, further comprising:
a third communication module communicatively coupled to the first or second communication module, the third communication module includes at least one port for the second network.

15. The implement of claim 14, wherein the first network gateway is configured to receive a communication, to inspect header information from a packet of the communication, to determine a source port that sent this communication based on source identification (ID) or source address of the header information, and to determine a physical location of the source port based on the source ID or source address.

16. The implement of claim 15, wherein the PoE network transmits a sequence of messages to the at least two ports of the second communication module to determine a configurable connection for each of the at least two ports of the second communication module.

17. The implement of claim 16, wherein the second communication module receives power from an upstream module having PoE or has a separate power supply.

18. The implement of claim 16, wherein the PoE network supports significantly higher bit rates than bit rates of the first network.

19. The implement of claim 12, wherein the first network comprises a controller area network (CAN) and the second network comprises the Power over Ethernet network.

20. The implement of claim 12, wherein the second network comprises the PoE network to pass electric power and data on an Ethernet cable.

* * * * *